June 30, 1942.  P. E. PEARSON  2,287,823
CROWN CAP FEEDING AND POSITIONING MEANS
Filed Nov. 9, 1938  6 Sheets-Sheet 1
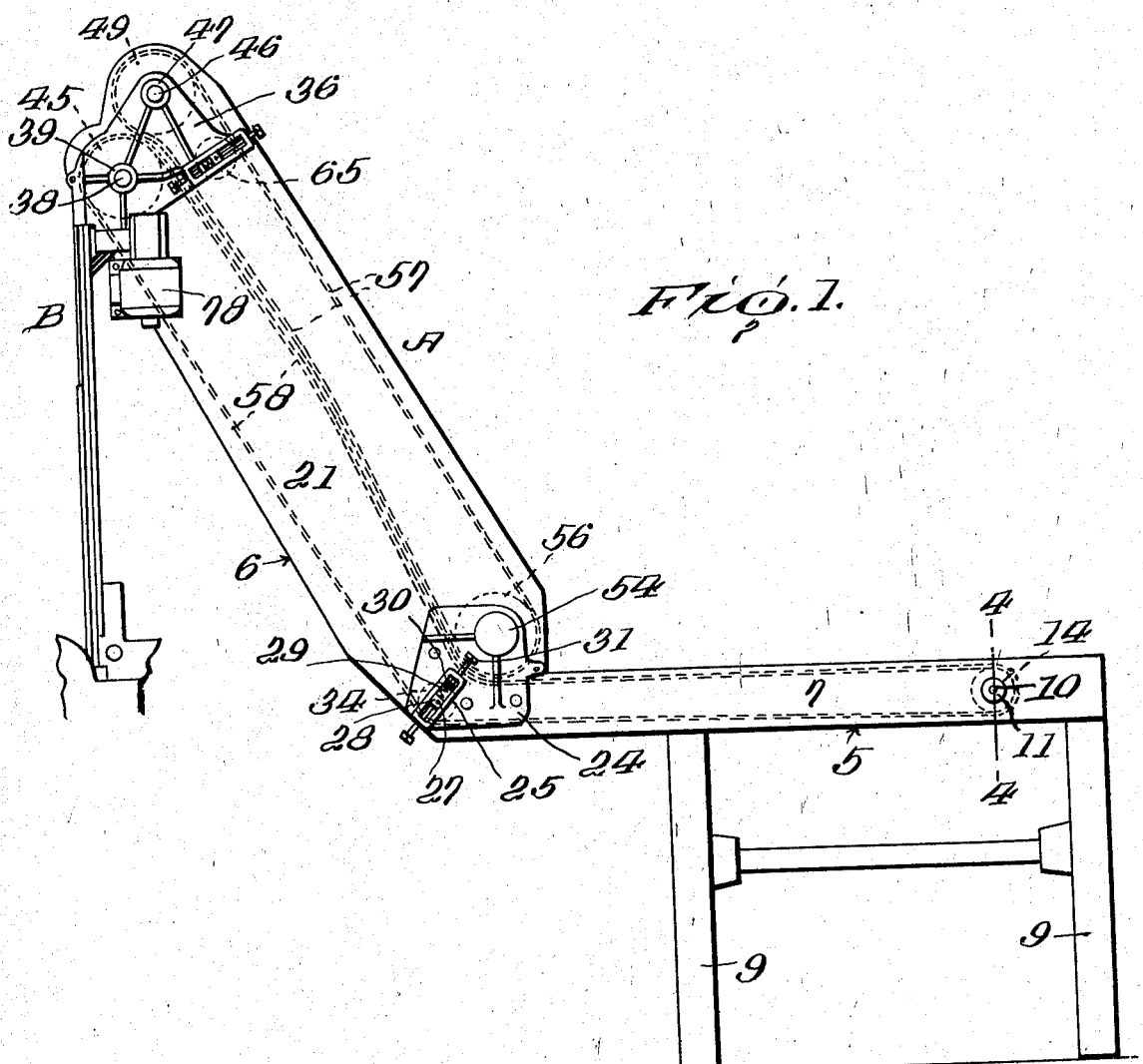
Fig. 1.
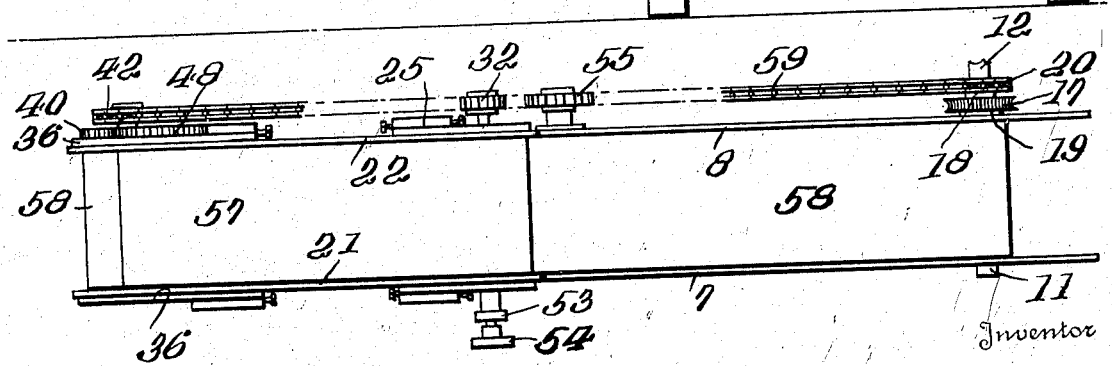
Fig. 1ª.
Inventor
Paul E. Pearson
By Mason & Porter
Attorneys June 30, 1942.  P. E. PEARSON  2,287,823
CROWN CAP FEEDING AND POSITIONING MEANS
Filed Nov. 9, 1938  6 Sheets-Sheet 2
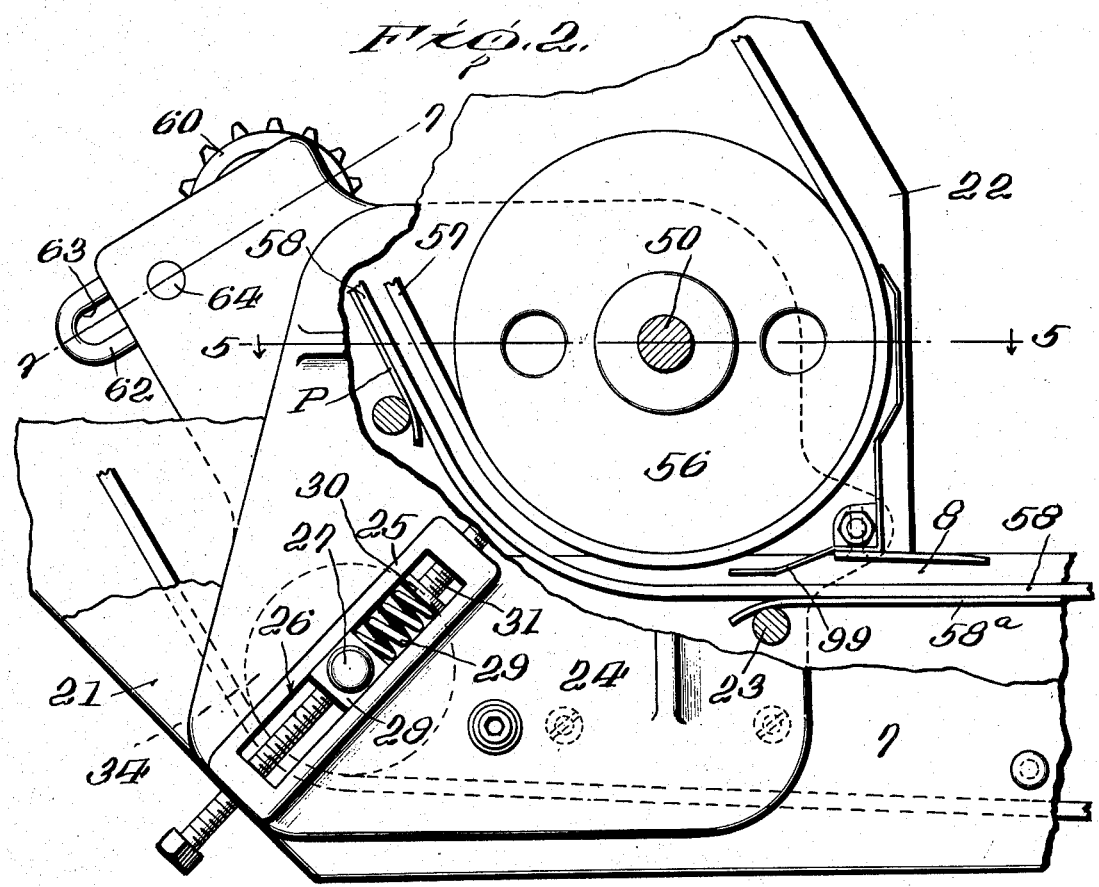
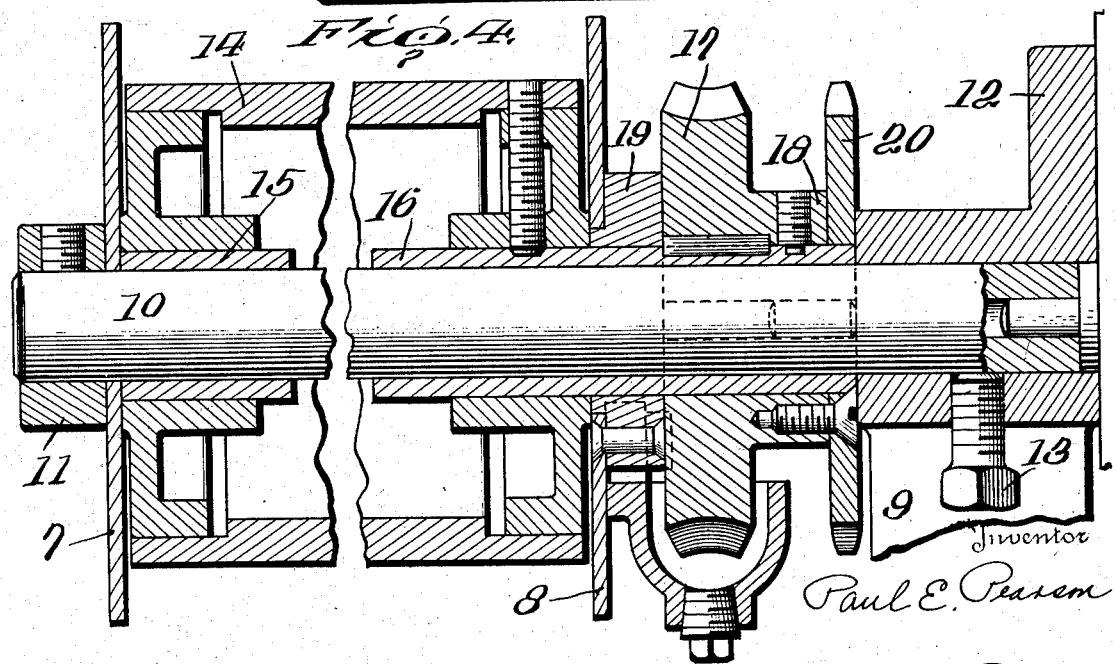
Inventor
Paul E. Pearson
By
Mason & Porter
Attorneys June 30, 1942. P. E. PEARSON 2,287,823
CROWN CAP FEEDING AND POSITIONING MEANS
Filed Nov. 9, 1938 6 Sheets-Sheet 3
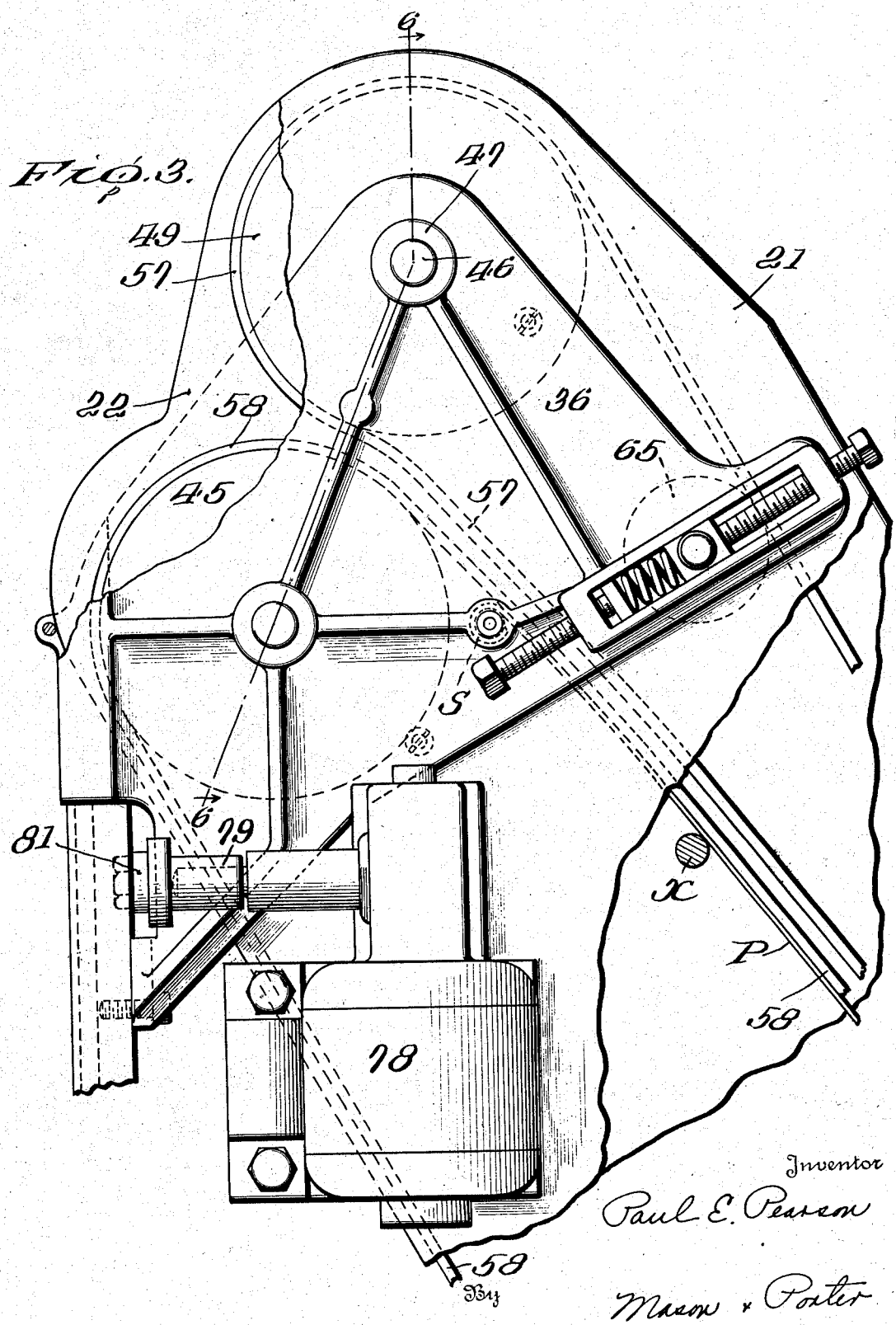
Inventor
Paul E. Pearson
By Mason & Porter
Attorneys June 30, 1942.   P. E. PEARSON   2,287,823
CROWN CAP FEEDING AND POSITIONING MEANS
Filed Nov. 9, 1938   6 Sheets—Sheet 4
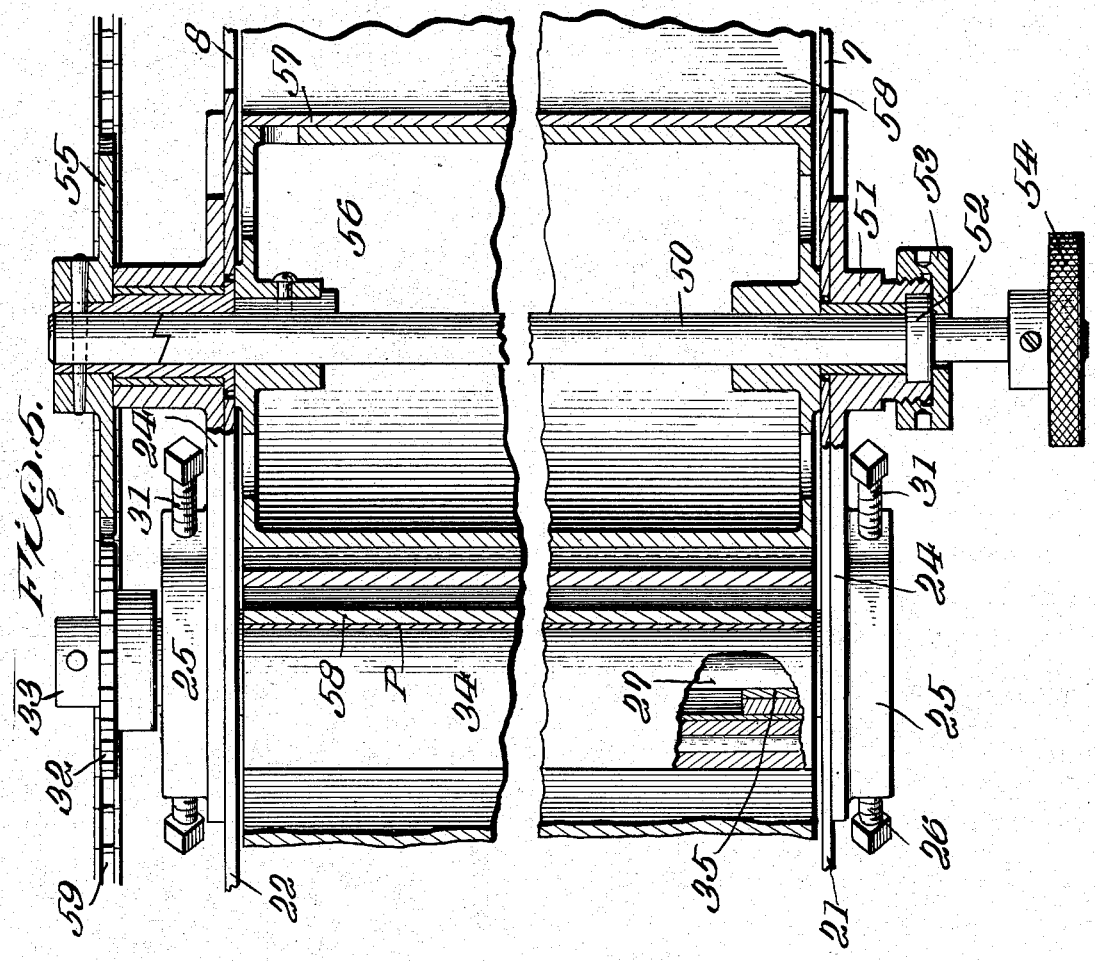
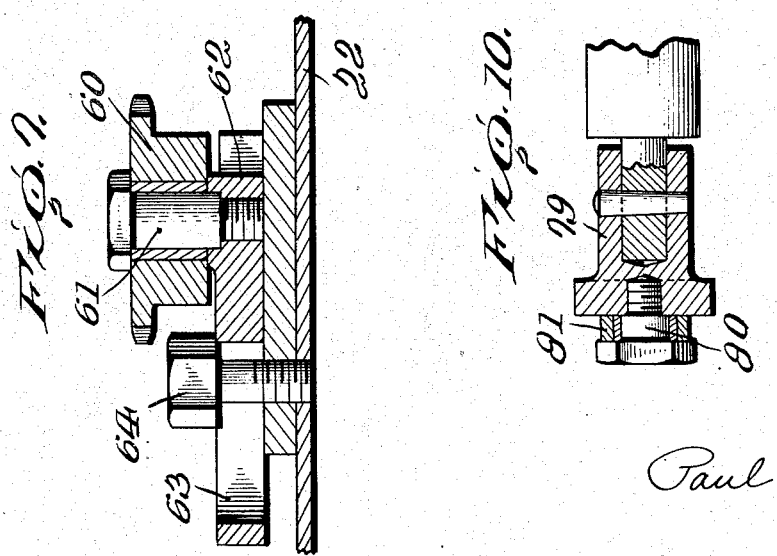
Inventor
Paul E. Pearson
By Mason & Porter
Attorneys

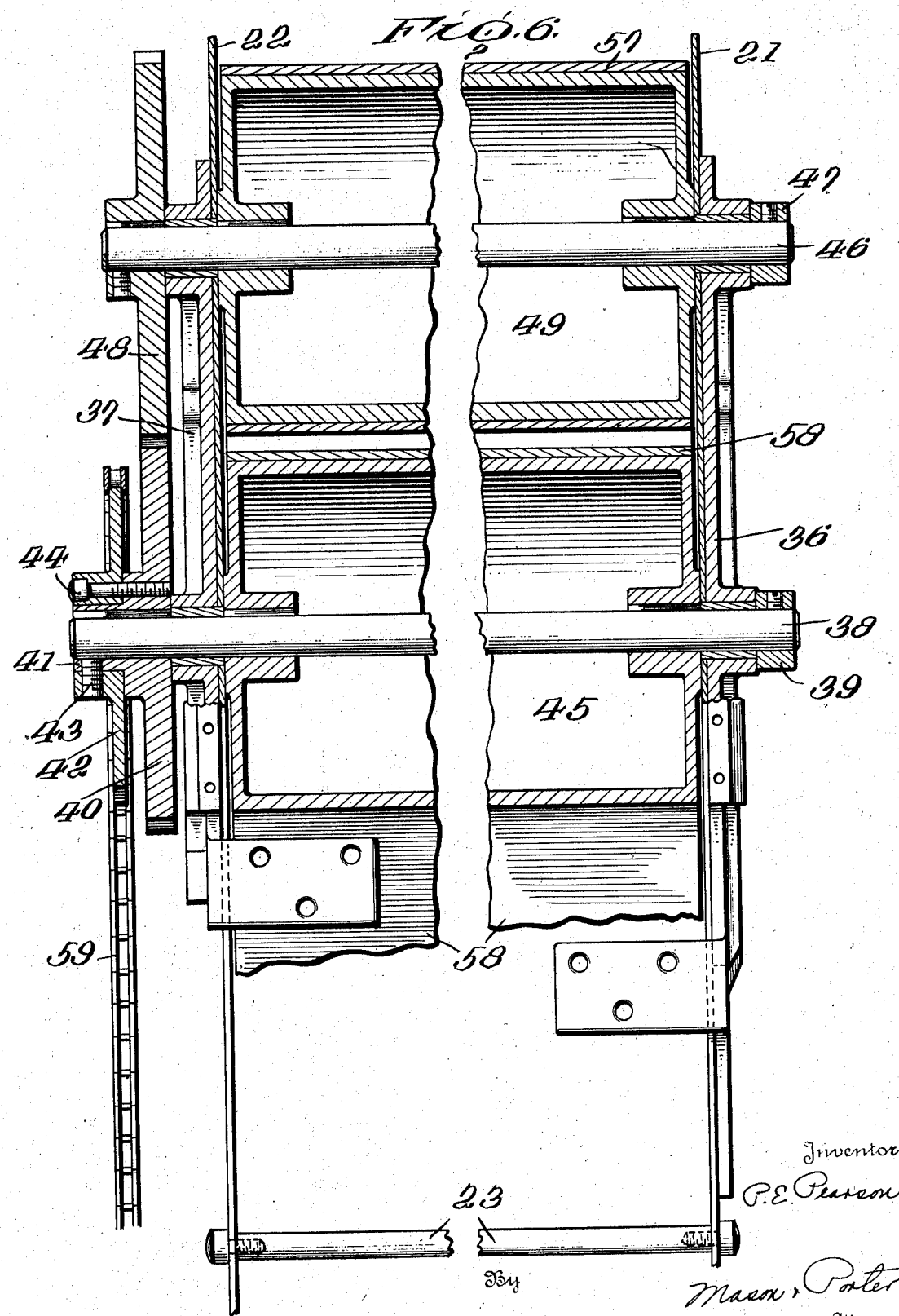

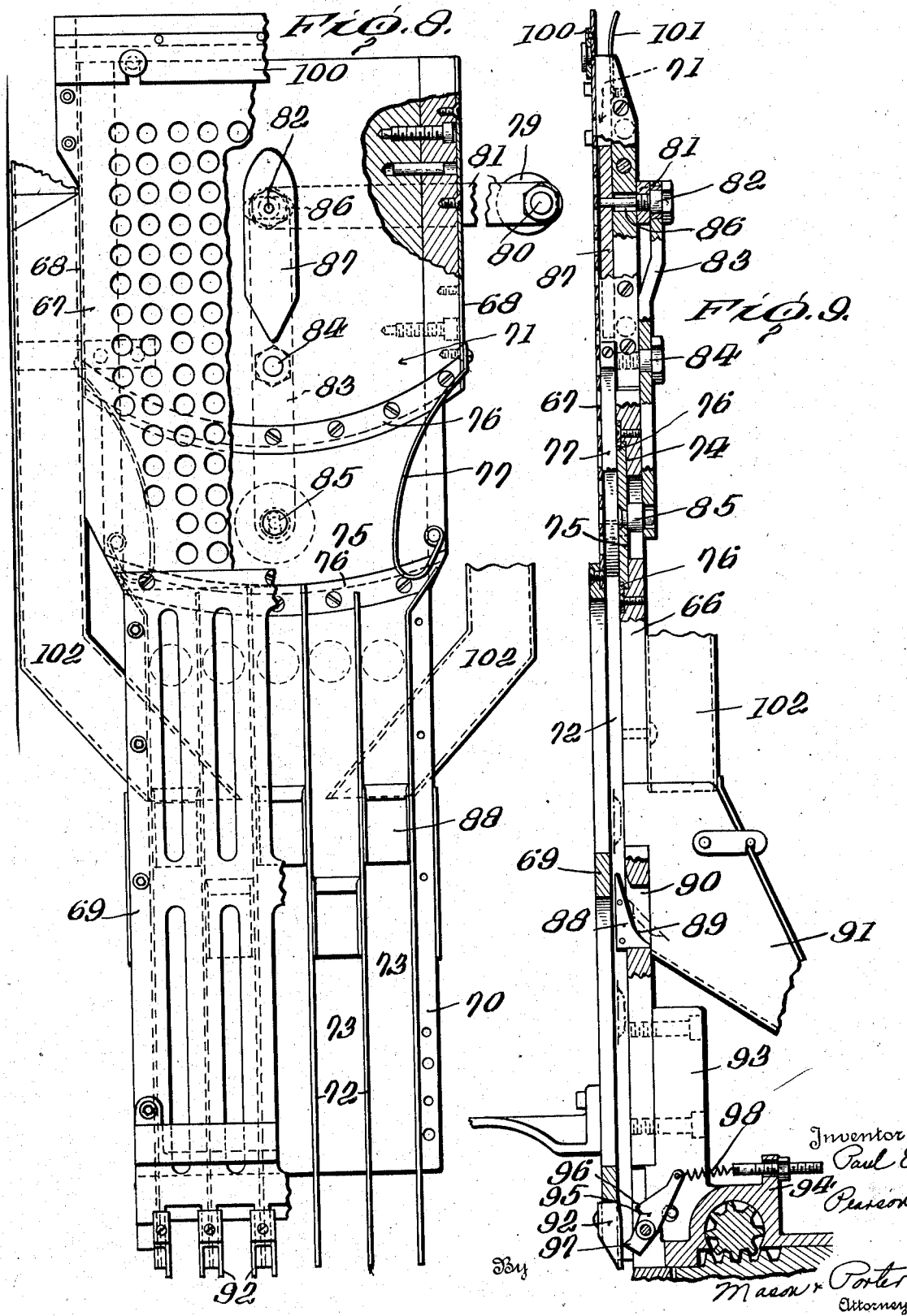

Patented June 30, 1942

2,287,823

UNITED STATES PATENT OFFICE 2,287,823

CROWN CAP FEEDING AND POSITIONING MEANS

Paul E. Pearson, Chicago, Ill., assignor to Continental Can Company, Inc., New York, N. Y., a corporation of New York Application November 9, 1938, Serial No. 239,726

11 Claims. (Cl. 113—114)

The invention relates generally to article feeding and assorting or arranging mechanisms and primarily seeks to provide certain new and useful improvements in mechanism for feeding crown caps and for positioning them systematically so as to facilitate the performing of certain operations thereon, such as center spotting.

In its more detailed nature, the invention resides in the provision of an apparatus of the character stated including an upstanding delivery chute portion in which the crown caps are to be arranged in vertical columns all facing one way, a conveyor portion for receiving crown caps and conveying them to and delivering them into the chute portion, and novel means in the chute portion for rejecting all improperly positioned crown caps.

Another object of the invention is to provide novel means in the chute portion for agitating and preventing bridging or jamming of the crown caps.

Another object of the invention is to provide an apparatus of the character stated in which is embodied a crown cap conveyor portion including opposed belt flights between which more or less symmetrically arranged rows of caps are gripped so as to be conveyed along while being retained in the arrangement stated.

Another object of the invention is to provide novel means for yieldably supporting and bowing the opposed belt flight portions.

With the above and other objects in view that will hereinafter appear, the nature of the invention will be more fully understood by following the detailed description, the appended claims, and the several views illustrated in the accompanying drawings.

In the drawings:

Figure 1 is a right side elevation illustrating the invention.

Figure 1A is a plan view of the parts shown in Figure 1.

Figure 2 is an enlarged right side elevation at the junction of the horizontal and upwardly inclined portions of the conveyor belt assembly.

Figure 3 is an enlarged right side elevation of the upper end portion of the conveyor belt assembly.

Figure 4 is a detail vertical cross-section taken on the line 4—4 on Figure 1.

Figure 5 is a detail horizontal section taken on the line 5—5 on Figure 2.

Figure 6 is a detail cross-section taken on the line 6—6 on Figure 3.

Figure 7 is a detail fragmentary section taken on the line 7—7 on Figure 2.

Figure 8 is an enlarged face view of the assorting and feeding chute, parts being broken away and in section.

Figure 9 is a central vertical cross-section of the chute structure shown in Figure 8.

Figure 10 is a detail section illustrating the mounting of the agitator crank disk.

In the embodiment of the invention herein disclosed there is included a crown cap conveyor unit adapted to receive caps successively aligned in rows from an associated assembling machine and feed the caps in correct disposition into an associated cap spotting machine. This unit includes a conveyor belt assembly A and a sorting or feed chute B.

The conveyor belt assembly A comprises a horizontal portion 5 having one end, hereinafter designated the receiving end, disposed under the the discharge chute of an associated assembling machine (not shown), and an inclined portion 6 extending upwardly from the other end of the horizontal portion. See Figure 1.

The horizontal portion 5 includes a pair of side plates 7, 8 disposed in spaced relation and supported on any suitable framing such as is generally indicated at 9.

A shaft 10 is mounted transversely through the plates 7, 8 adjacent the receiving end of the conveyor and has its ends projecting outwardly therefrom. One end of the shaft is secured by a collar 11 mounted thereon, and the other end extends into an aperture in a bracket portion 12 of the frame 9 spaced from the plate 8, and is maintained therein by a set screw 13. A belt-receiving pulley 14 is rotatably mounted on the shaft intermediate the plates and is secured to a pair of spaced bearing sleeves or bushings 15, 16. The bushing 16 extends through the plate 8 to the position of the bracket 12. A worm gear 17 having a hub 18 for engagement with any desired power drive, is secured to the bushing 16 and is spaced from the plate 8 by a spacing element 19 secured to said plate. A sprocket 20 is secured to the face of the hub 18. See Figure 4.

The inclined portion 6 includes a pair of plates 21, 22 having their lower ends adjoining the ends of the plates 7, 8, and the plates 21, 22 are maintained in spaced parallel relation by a plurality of spacing rods or stay bolts 23. The junction of the inclined plates with the horizontal plates is reinforced by suitable reinforcing or gusset plates 24 secured at the outsides thereof, and the gusset plates are provided with outwardly extending projections 25 having shaft receiving slots 26 therein. See Figures 2 and 5.

A shaft 27 is adjustably mounted in the slots 26 in bearing blocks 28 pinned thereto, one end of the shaft projecting beyond the plate as indicated at the left in Figure 5. A compression spring 29 is interposed between each member 28 and an adjacent follower 30 adapted to be adjustably positioned by an adjusting screw 31 extending through the uppermost end of each projection 25. A sprocket gear 32 is secured to the projected end of the shaft 27 and is coplanar with the sprocket 20 hereinbefore referred to. The end of the shaft 27 is fitted with an end collar 33. A belt-engaging pulley 34 is rotatably mounted on the shaft 27, intermediate the plates through the medium of sleeve bearings or bushings 35. See Figure 5.

The upper ends of the inclined plates 21, 22 are reinforced by gusset plates 36, 37 secured at the outsides thereof. A shaft 38 is journalled in the plates 21, 22 near the upper ends thereof and has its ends projecting outwardly therefrom through the gusset plates 36, 37. An end collar 39 is secured to the right hand end of the shaft 38, and a spur gear 40 having a hub 41 of reduced diameter is keyed onto the other extending end of said shaft and is maintained in spaced relation to the surface of the rear gusset plate 37 by a projection formed on said plate. A sprocket gear 42 is mounted on the hub 41 of the spur gear and is secured thereto by a set screw 43 in the hub and a securing screw 44 threadably engaged with the spur gear. A belt-receiving pulley 45 is keyed onto the shaft 38 and is disposed intermediate the inclined plates 21, 22. See Figure 6.

A shaft 46 is journalled in the plates 21, 22 adjacent the upper ends thereof and has its ends projecting outwardly through the gusset plates 36, 37. The axis of the shaft 46 is disposed above and rearwardly of the axis of the shaft 38, and an end collar 47 is secured to the right hand end of the shaft 46. A spur gear 48 is keyed to the other end of the shaft 46 and is maintained in spaced relation to the surface of the gusset plate 37 by a projection formed thereon. The spur gear 48 has a diameter equal to and engages the spur gear 40. A belt-receiving pulley 49 is keyed to the shaft 46 and is disposed intermediate the inclined plates 21, 22. See Figure 6.

A shaft 50 is journalled in the plates 21, 22 adjacent their junction with the horizontal plates 7, 8, and has its ends projecting outwardly from the gusset plate 24. The axis of the shaft 50 is disposed above and to the rear of the yieldably mounted shaft 27. The forward end of the shaft 50 extends through a projection 51 on the right hand gusset plate 24, and the shaft is provided with an annular collar 52 rigidly secured thereto, which is set into a counter bore in the projection 51 and is maintained therein against axial movement by a nut 53, threadably mounted on the end of the projection. At its right hand end, the shaft 50 is provided with a hand wheel 54. The other end of the shaft 50 extends through a projection on the other gusset 24 and has a sprocket gear 55 secured thereto as by a taper pin. The sprocket 55 and the sprocket 32 are disposed in coplanar relation. A belt-receiving pulley 56, equal in diameter to the pulley 49, is keyed on the shaft 50 and is disposed intermediate the plates 21, 22. See Figures 2 and 5.

An endless belt 57 is looped around the pulleys 49, 56. Another endless belt 58 is led around the pulley 14, under the pulley 56 and its associated belt 57, thence upwardly and over the pulley 45, thence downwardly and under the yieldably mounted tensioning pulley 34 and back to the pulley 14. It is to be noted that the adjacent surfaces of the belts 57, 58 are maintained in close relation to provide a positive advancement of the caps being conveyed therebetween when the apparatus is in operation. The tension of the belt 58 can be regulated through appropriate adjustments of the spring pressed followers 30 in order to provide a tight or loose gripping of the conveyed caps. The opposed flights of the belts 57, 58 are held in upwardly-rearwardly bowed relation by a bowed bed plate P secured at its upper end between the plates 21, 22 as at S and supported intermediate its ends and at its lower end as at X. The bed plate is thus mounted in a manner permitting it to yield or extend itself longitudinally accordingly as greater or lesser load pressure is applied thereto. The upper horizontal flight portion of the belt 58 may be supported upon a suitable bed plate 58a. See Figures 2 and 3.

All of the conveyor pulleys are positively driven from the worm gear 17 through the medium of an endless chain 59 which is led around the plate sprocket 20, thence under the sprocket 55 and up over the sprocket 42, thence downwardly under the tensioning sprocket 32 and back to the sprocket 20. The pulley 49 is positively driven from the pulley 45 through the medium of the engaging spur gears 40, 48.

Proper alignment and additional tensioning of the driving chain 59 is attained through the medium of an adjustably mounted idler sprocket 60. The idler sprocket 60 is rotatably mounted on a collared shaft 61 secured to a block 62. The block 62 is provided with a slot 63 through which a clamping bolt 64 extends. See Figures 2 and 7.

Proper tensioning of the endless belt 57 is attained through the medium of an idler pulley 65 which is adjustably and yieldably mounted between the plates 21, 22 on an axis near the upper ends thereof. The mounting of the idler pulley 65 is similar to that of the adjustable pulley 34, except that the direction of applied force is diametrically opposite. See Figure 3.

The sorting or feed chute B is best shown in Figures 8 and 9 of the drawings and includes a back plate 66, an upper front plate 67 spaced from the back plate by upper side plates 68, 68, and a lower front plate 69 joined to the upper front plate and spaced from the back plate by lower side plates 70, 70, thereby defining a cap-receiving chamber 71. The feed chute B is positioned vertically with its upper end located directly beneath the discharge end of the conveyor assembly belts 57, 58. The front or facing plate 67 preferably is apertured as shown in Figures 8 and 9 so that crown caps in the chamber 71 can be seen through the apertures.

The lower end of the cap-receiving chamber 71 is provided with a plurality of spaced parallel ribs 72 disposed in vertical position to thereby form a plurality of vertical chutes 73 for receiving and aligning individual caps. An arcuate recess 74 is formed in the front face of the back plate 66 being defined by concentric upper and lower shoulders. A plate 75 having concentric arcuate upper and lower edges, is slidable back and forth in a lateral direction in the recess 74 and is retained therein by arcuate retainer plates 76.

A pair of leaf springs 77, 77 have lower rebent ends pinned to the lower corners of the movable plate 75, and their upper ends respectively secured to the chute side plates 66. The arcuate plate 76 is adapted to be oscillated through the medium of a linkage system which includes a motor 78 mounted on the side plate 21 of the conveyor assembly. A bushing 79 having an eccentric or crank pin 80 is secured to the end of the motor unit drive shaft. See Figure 10. A laterally extending link 81 is pivotally connected at one end to the pin 80 and at its other end, as by a pivot pin 82, to the upper end of a vertically disposed link 83 fulcrumed at its mid-point as at 84 to the rear face of the chute plate 66. The lower end of the link 83 is slot and pin connected as at 85 with the arcuate plate 76, a suitable opening being provided in the back plate 66 to permit the positioning and the necessary movement of the pin. The pivot pin 82 joining the links 81, 83 is provided with a forwardly extended end which passes through a clearance opening 86 in the back plate and loosely fits in a bore in an agitator bar 87 located within the upper chute chamber 71. See Figures 8 and 9. The agitator bar is moved back and forth and serves to keep the caps in the upper chute portion in motion, and the oscillating plate 76 in conjunction with the leaf springs 77, by their lateral movement, keep the caps in motion farther down, and by this means proper feeding of the caps into the individual vertical chutes 73 is assured.

Each chute 73 is provided with a rejecting guide 88 secured between the adjacent ribs 72 and disposed in such a manner that caps moving through the chute with the concave portions extending forwardly, or to the left as viewed in Figure 9, will be allowed to continue downwardly, but caps positioned with the concave portions extending rearwardly will engage at their rims with the rear cam surface 89 of the guide and be diverted through openings 90 in the back plate and into a rejection or discharge chute 91. See the dot and dash line illustrations of falling caps in Figure 9. Such rejected caps are directed into any desired type of container or pick-up device, not shown.

The extreme lower end of each individual chute 73 is fitted with spaced forwardly extending guides 92 respectively secured to downwardly extending fingers 92a on the lower front plate 69. These guides 92 are for the purpose of properly aligning the caps with the center spot carrying elements of an associated spotting machine of any suitable type, an example of which is disclosed in my copending application for U. S. Letters Patent, filed October 28, 1938, Serial Number 237,534.

The lower end of the chute B is secured to a mounting bracket which includes upstanding portions 93 and a horizontal portion 94. The horizontal portion 94 supports a plurality of escapements for retaining the caps in and allowing the caps to be removed from the individual chutes 73. The escapements include a plurality of pawls 95 having upper and lower cap-engaging dogs 96, 97, and all are mounted on a common shaft. The pawls are normally and yieldably maintained in a cap-retaining position by coil springs 98 anchored to the bracket portion 94. The lower dogs 97 normally are presented for yieldably retaining the caps in the chutes. As the bottom caps are withdrawn from the chutes in a manner such as is described in the copending patent application hereinbefore referred to, the lower dogs are moved rearwardly, thus bringing the upper dogs 96 into position to temporarily retain the stack of caps in the chutes, and after the bottom caps have been removed the pawls spring back to the normal position and allow the stacks of caps to advance downwardly. See Figure 9.

In operation, the caps are deposited onto the horizontal portion of the conveyor belt 58 in closely related laterally and longitudinally aligned rows from the discharge of any associated assembling machine and pass under a spring guide 99 overlying the belt in a plane near the junction of the belts 57, 58. The caps are then gripped between the opposing faces of the adjacent portions of the belts 57, 58 and are elevated to the top of the conveyor assembly. At the top of the conveyor assembly they are discharged into the top of the chute B, or rather the chamber 71 thereof, falling between a top front guard plate 100 secured to the upper front chute plate, and a top rear guard 101 secured to the upper rear chute plate. The distance between the guards 100, 101 is less than the thickness of double or nested caps, so that if "doubles" should occur they will be rejected. As the single caps fall into the upper chute portion they are constantly agitated by the agitator bar 87 to prevent jamming there. Continued downward motion of the caps brings them into engagement with the agitator springs 77 and the moving plate 75 and they are consequently given a certain amount of translatory movement which prevents jamming and assures movement of the caps into the individual chutes 73.

The flow of caps into the chute, combined with the constant agitation of the caps within and filling the chute, serve to direct any "doubles" setting on the spaced guards 100, 101 to one side or the other where they will drop into overflow chutes 102 provided for the purpose. The lower ends of the overflow chutes empty into the discharge or rejection chute 91.

While the invention has been described as particularly adaptable to use in feeding assembled crown caps from an assembling machine, in which the cork or other pads are inserted and affixed in the metal caps, to a center spotting machine, in which center spots are affixed to the pads contained in the caps, it will be obvious that the apparatus herein disclosed can, with equal facility, be employed in feeding crown caps devoid of pads to suitable mechanism for inserting and affixing said pads. An example of center spotting machinery such as has been referred to just above is disclosed in my copending application for U. S. Letters Patent, Serial Number 237,534, filed October 28, 1938.

It is of course to be understood that the details of structure and arrangement of parts may be variously changed and modified without departing from the spirit and scope of the invention.

I claim:

1. In apparatus of the character described, a cap receiving and delivering chute including a cap receiving chamber, means for receiving caps from the chamber and arranging them in longitudinal rows, an agitator vane freely swingable on a pivot pin in said chamber, and means for reciprocating the pin transversely of its axis.

2. In apparatus of the character described, a cap receiving and delivering chute including a cap receiving chamber, means for receiving caps from the chamber and arranging them in longitudinal rows, an oscillatable plate in said chamber for agitating caps entering said arranging means, and flat springs attached to and movable with the plate and forming cap engaging side wall portions.

3. In apparatus of the character described, a cap receiving and delivering chute including a cap receiving chamber, means for receiving caps from the chamber and arranging them in longitudinal rows, an oscillatable plate in said chamber for agitating caps entering said arranging means, flat springs attached to and movable with the plate and forming cap engaging side wall portions, an agitator vane freely swingable on a pivot pin in said chamber, and means for reciprocating the pin transversely of its axis.

4. In apparatus of the character described, a cap receiving and delivering chute including a cap receiving chamber, means for receiving caps from the chamber and arranging them in longitudinal rows, an oscillatable plate in said chamber for agitating caps entering said arranging means, an agitator vane in said chamber, a lever pivoted intermediate its ends, means connecting the plate with one end of said lever, means for mounting the vane on the other end of said lever, and means for rocking said lever to impart movement to said plate and vane.

5. In apparatus of the character described, a cap receiving and delivering chute including a cap receiving chamber, means for receiving caps from the chamber and arranging them in longitudinal rows, an oscillatable plate in said chamber for agitating caps entering said arranging means, flat springs attached to and movable with the plate and forming cap engaging side wall portions, an agitator vane in said chamber, a lever pivoted intermediate its ends, means connecting the plate with one end of said lever, means for mounting the vane on the other end of said lever, and means for rocking said lever to impart movement to said plate and vane.

6. In apparatus of the character described, a cap receiving and delivering chute including a cap receiving chamber, means for receiving caps from the chamber and arranging them in longitudinal rows, an oscillatable plate in said chamber for agitating caps entering said arranging means, an agitator vane in said chamber, a lever pivoted intermediate its ends, means connecting the plate with one end of said lever, means for mounting the vane on the other end of said lever, side wall members attached to and movable with said plate, and means for rocking said lever to impart movement to said plate and vane.

7. In crown cap conveying and arranging apparatus, a flat walled delivery chute structure for receiving caps and delivering them to a definite place by direct straight line gravity drop, means, including an agitator, in said chute structure effective for arranging the caps in longitudinal rows, and means engageable with the caps while passing in rows through said arranging means for diverting improperly positioned caps from the straight line gravity drop path and rejecting them from the chute.

8. In crown cap conveying and arranging apparatus, a flat walled delivery chute structure for receiving caps and delivering them to a definite place, said chute structure including flat wall portions defining a stationary cap receiving chamber through which the caps fall by gravity without change of direction and which throughout the whole thereof is wide enough and deep enough to receive a plurality of caps indiscriminately but so shallow as to prevent receiving therein of superposed caps, means for receiving the caps from the chamber and arranging them in longitudinal rows, and means movable in said chamber for agitating said caps to cause them to move into said row arranging means without jamming.

9. In crown cap conveying and arranging apparatus, a flat walled delivery chute structure for receiving caps and delivering them to a definite place, said chute structure including flat wall portions defining a stationary cap receiving chamber through which the caps fall by gravity without change of direction and which throughout the whole thereof is wide enough to receive a plurality of caps indiscriminately but so shallow as to prevent receiving therein of superposed caps, and means for receiving the caps from the chamber and arranging them in longitudinal rows, said flat wall portions including an oscillatable plate of a size greater in width and length than the combined diameters of a plurality of caps and disposed for agitating caps entering said arranging means.

10. In apparatus of the character described, a generally flat cap receiving and delivering chute structure including a cap receiving chamber too narrow to receive caps in superposed face to face relation, means for directly receiving caps from the chamber and arranging them in longitudinal rows, a plate reciprocable transversely with relation to the path of movement of the caps into said row arranging means and dimensioned for defining a wall of said chamber against which a mass of caps in superposed vertical and also lateral edge to edge relation engages, and means for oscillating said plate to agitate said mass of caps back and forth transversely with respect to the rows to be arranged and at the position at which said caps are about to enter said row arranging means.

11. In apparatus of the character described, a generally flat cap receiving and deliverying chute structure including a cap receiving chamber too narrow to receive caps in superposed face to face relation, means for directly receiving caps from the chamber and arranging them in longitudinal rows, a plate reciprocable transversely with relation to the path of movement of the caps into said row arranging means and dimensioned for defining a wall of said chamber against which a mass of caps in superposed vertical and also lateral edge to edge relation engages, means for oscillating said plate to agitate said mass of caps back and forth transversely with respect to the rows to be arranged and at the position at which said caps are about to enter said row arranging means, and chamber defining side wall members attached to and movable with said plate.

PAUL E. PEARSON.